United States Patent
Reilio et al.

(10) Patent No.: US 9,958,250 B2
(45) Date of Patent: May 1, 2018

(54) METHOD AND ARRANGEMENT FOR DETERMINING LOCATION AND/OR SPEED OF A MOVING OBJECT AND USE OF THE ARRANGEMENT

(71) Applicant: KONE CORPORATION, Helsinki (FI)

(72) Inventors: Esa Reilio, Helsinki (FI); Hannu Kulju, Hyvinkää (FI); Otto Korkalo, Helsinki (FI); Tuomas Kantonen, Espoo (FI)

(73) Assignee: KONE CORPORATION, Helsinki (FI)

( * ) Notice: Subject to any disclaimer, the term of this patent is extended or adjusted under 35 U.S.C. 154(b) by 745 days.

(21) Appl. No.: 14/319,944

(22) Filed: Jun. 30, 2014

(65) Prior Publication Data

US 2014/0312884 A1 Oct. 23, 2014

Related U.S. Application Data

(63) Continuation of application No. PCT/FI2012/051300, filed on Dec. 27, 2012.

(30) Foreign Application Priority Data

Dec. 30, 2011 (FI) ..................................... 20116342

(51) Int. Cl.
*G01D 1/00* (2006.01)
*G06F 15/00* (2006.01)
(Continued)

(52) U.S. Cl.
CPC ............ *G01B 7/004* (2013.01); *B66B 1/3492* (2013.01); *G01P 3/42* (2013.01); *B66B 19/007* (2013.01); *G01P 3/50* (2013.01)

(58) Field of Classification Search
CPC ..... G01B 7/004; B66B 1/3492; B66B 19/007; G01P 3/42; G01P 3/50
See application file for complete search history.

(56) References Cited

U.S. PATENT DOCUMENTS 5,311,173 A * 5/1994 Komura ................. G01C 21/30
                                                                           340/988
6,211,666 B1 * 4/2001 Acker ....................... A61B 5/06
                                                                           128/899

(Continued)

FOREIGN PATENT DOCUMENTS

GB          2477149 A     7/2011
WO   WO 2004/106210 A1   12/2004

OTHER PUBLICATIONS

Gozick, B. et al, "Magnetic maps for indoor navigation", IEEE Transactions on Instrumentation and Measurement, vol. 60, No. 12, Dec. 1, 2011, pp. 3883-3891.

(Continued)

*Primary Examiner* — David M Gray
*Assistant Examiner* — Geoffrey T Evans
(74) *Attorney, Agent, or Firm* — Birch, Stewart, Kolasch & Birch, LLP

(57) ABSTRACT

A method and an arrangement is provided for determining the location and/or speed of an object configured to move along a controlled trajectory, in connection with which object is fitted a measuring device measuring at least the magnetic field acting on the object in its different locations, which measuring device comprises a device configured to measure the magnetic field, from the measuring data received from which device a magnetic footprint describing the magnetic field acting on the object in its different locations is formed, which magnetic footprint is recorded in connection with a teaching run, or with self-learning, for later use. The location of the object after a teaching run is determined by measuring in essentially real-time in the direction of the three coordinates X, Y, Z of the magnetic field acting on the object moving along a controlled trajectory and by comparing the measurement results to a mag- (Continued)

Figure 1:
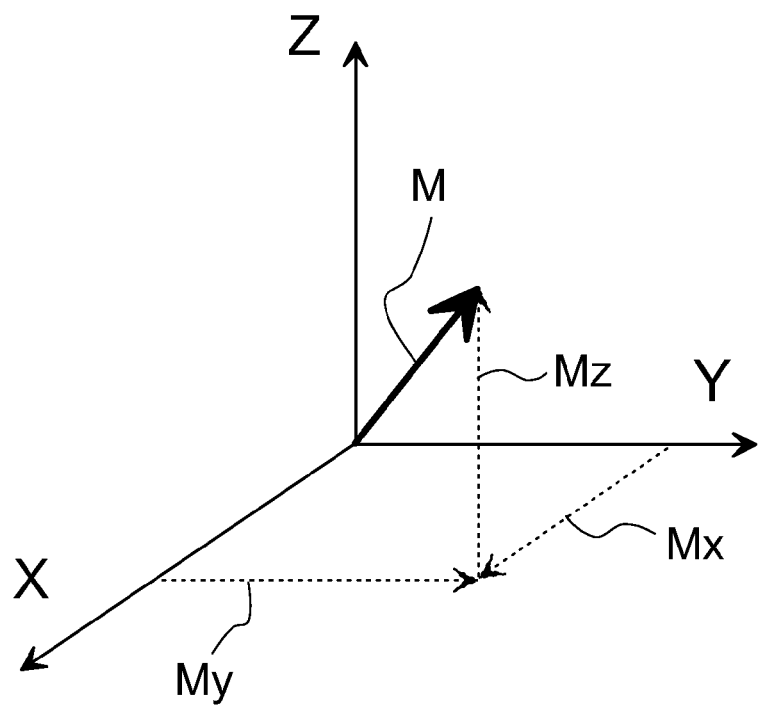

netic footprint recorded in advance and also by deducing as a result of the comparison the exact location of the object on its path of travel.

20 Claims, 8 Drawing Sheets

(51) Int. Cl.
G06M 11/04 (2006.01)
G01B 7/004 (2006.01)
B66B 1/34 (2006.01)
G01P 3/42 (2006.01)
G01P 3/50 (2006.01)
B66B 19/00 (2006.01)

(56) References Cited

U.S. PATENT DOCUMENTS 6,336,064 B1* 1/2002 Honkura .............. G01C 21/26
180/167
2010/0102809 A1* 4/2010 May ..................... G01R 33/022
324/244
2014/0067184 A1* 3/2014 Murphy ............... G05D 1/0265
701/23
2015/0262461 A1* 9/2015 Richter ................ G08B 13/149
340/568.1

OTHER PUBLICATIONS

Haverinen, J. et al, "A global self-localization technique utilizing local anomalies of the ambient magnetic field", Proceedings of IEEE International Conference on Robotics and Automation, Kobe, Japan, May 12-17, 2009, pp. 3142-3147.

Subbu, K.P. et al, "Indoor Localization through Dynamic Time Warping", Proceedings of IEEE International Conference on Systems, Man, and Cybernetics (SMC), Oct. 9-12, 2011, Anchorage, U.S.A., pp. 1639-1644.

Vallivaara, Ilari et al, "Magnetic field-based SLAM method for solving the localization problem in mobile robot floor-cleaning task", The 15th Intl Conference on Advanced Robotics, Tallinn, Estonia, Jun. 20-23, 2011, pp. 198-203.

* cited by examiner

Fig. 8

| | Motion state of the object | | Nature of the change of the footprint | | | Possible learnable recurrence of the footprint | | Reason of the change of the footprint | | | Location of the cause of the change of the footprint | |
|---|---|---|---|---|---|---|---|---|---|---|---|---|
| | no move | moves | temporary | permanent | | recurrent | not recurrent | known | unknown | | in the object | outside the object |
| A | x | x | no change | no change | | | | no change | no change | | no change | no change |
| B | x | | no change | no change | | x | | x | | | x | |
| C | x | | x | | | | x | | x | | | x |
| D | x | | x | | | x | | x | | | | x |
| E | x | | | x | | | x | x | | | x | |
| F | | x | x | | | x | | x | | | x | |
| G | | x | | x | | | x | x | | | x | |
| H | x | x | x | | | | x | | x | | | x |
| I | x | x | | x | | x | | x | | | x | |
| | no move | moves | temporary | permanent | | recurrent | not recurrent | known | unknown | | in the object | outside the object |
| | Motion state of the object | | Nature of the change of the footprint | | | Possible learnable recurrence of the footprint | | Reason of the change of the footprint | | | Location of the cause of the change of the footprint | |

METHOD AND ARRANGEMENT FOR DETERMINING LOCATION AND/OR SPEED OF A MOVING OBJECT AND USE OF THE ARRANGEMENT

CROSS REFERENCE TO RELATED APPLICATIONS

This application is a Continuation of PCT International Application No. PCT/FI2012/051300, filed on Dec. 27, 2012, which claims priority under 35 U.S.C. 119(a) to Patent Application No. 20116342, filed in Finland on Dec. 30, 2011, all of which are hereby expressly incorporated by reference into the present application.

The object of the invention is a method as defined in the preamble of claim 1 and an arrangement as defined in the preamble of claim 11 and use of the arrangement as defined in claim 20 of the arrangement for determining the location of a moving object.

The arrangement according to the invention is particularly well suited for determining the exact location and/or speed of an object moving along a controlled path of travel, such as of an elevator car, of a crane, of a freight transport device or vehicle moving along a rail or track, as well as of a corresponding device or of some other object. Hereinafter the terms 'path of travel' or 'path of movement', or more briefly 'trajectory', of an object mean the same. A controlled trajectory refers to the trajectory that the object to be tracked is configured to travel, such that it has a limited number of degrees of freedom. In this case, e.g., an elevator car travels along its guide rails only in an essentially vertical direction, a crane or other corresponding vehicle travels along rails or corresponding reciprocally, and e.g. a tennis racquet or golf club travels a curved trajectory around a swivel point, i.e. the shoulder joint, restricted by the arm or arms. A moving object according to the invention therefore does not travel an undefined and random trajectory in some delimited space, but instead the determined trajectory is limited in its degrees of freedom, with guide rails or in some other manner, and predefined, which facilitates accurate location tracking of the object.

In an elevator the controlled optimal trajectory is generally, according to the guide rails, an essentially vertical trajectory, along which the elevator car, under control, travels and reaches the desired floor levels sufficiently precisely. Correspondingly in crane use and in other solutions moving along rails or a separate guided track, the optimal trajectory is the trajectory according to the rails or guided track along which the devices travel under control and arrive sufficiently accurately at the desired stopping places. Furthermore, in tennis strokes and golf strokes and in other corresponding executions of movement, the guided optimal trajectory is the optimal path of movement that is learned by the aid of the solution according to the invention. In this case the optimal path of movement repeats the best stroke performance until then or some external model stroke, e.g. the stroke performance of the coach or of some master.

The exact location at a certain moment of moving objects, such as the aforementioned moving devices, is generally defined e.g. with separate sensor/position sensor pairs, wherein the sensor is e.g. in/on the moving object and position sensors that are marks are fixed in the proximity of the path of travel of the moving objects for essentially the whole length of the path of travel. For example, in elevator use this means that the sensor or sensors are in connection with the moving elevator car and the position sensors, such as mechanical detectors, permanent magnets or e.g. RFID identifiers are at different points of the elevator hoistway and/or on the floor levels. A problem in all these solutions is, inter alia, the installation of the position sensors, which increases the installation time and also the costs and e.g. in connection with elevator solutions also increases dangerous situations because the position sensors must be separately installed in the elevator hoistway and installation in an elevator hoistway always has its own difficulties and dangers attached.

Magnetometers and the measurement of a magnetic field are used according to prior art also e.g. for detecting the path of movement and determining the location of an object moving itself, such as a robot or other corresponding device. In this case the trajectory of the moving object is, however, generally a two-dimensional plane, e.g. the floor, courtyard tiling, ground, et cetera, in which case the location must be defined in two dimensions. This causes measuring problems, and sufficiently accurate results are not easily obtained from the measuring. In these solutions the moving object is not able to detect its location, however, when it is taken to a randomly selected location on the plane on which it travels. Likewise, in solutions according to prior art a moving object is not able to itself learn the changed position data. Yet another problem is that an object that deflects the magnetic field and is randomly brought into the vicinity of this type of moving object interferes with the magnetic field acting in that location such that the moving object is no longer able to detect its own precise location.

The aim of this invention is to eliminate at least some of the aforementioned drawbacks and to achieve a simple and inexpensive and also operationally reliable method and arrangement for determining the location and/or speed of an object configured to move along a controlled trajectory, such as of an elevator car, of a crane, of a freight transport device or vehicle moving along a rail or track, or of some other corresponding device, or of an object configured to move along a controlled trajectory. The method according to the invention is characterized by what is disclosed in the characterization part of claim 1. Correspondingly, the arrangement according to the invention is characterized by what is disclosed in the characterization part of claim 11 and the use according to the invention is characterized by what is disclosed in the characterization part of claim 20. Other embodiments of the invention are characterized by what is disclosed in the other claims.

One advantage of the solution according to the invention is that time data, position data and possibly speed data needed as measuring data can be obtained extremely accurately and quickly and also without separately installed position sensors, in which case installation costs are smaller and there are fewer possibilities of error and hazards occurring in installation. Nevertheless sensors that are easily and quickly installed can be used e.g. in awkward situations for improving positioning accuracy and positioning reliability. Installation is simplified with the solution according to the invention, with consequent savings in costs and installation time as well as improvements in quality and work safety. In addition, the solution according to the invention enables savings connected to installation materials and logistics, in which case faulty deliveries and wastage, as well as storage on the installation site, are reduced and various logistical benefits are achieved. Another advantage is an increase in reliability and a reduction in servicing needs because the number of active components decreases. Yet another advantage is the harmonization of products and product structures as well as savings in product maintenance and in delivery quality and delivery reliability. Yet another advantage is e.g. more cost-effective modernization of old elevators, which enables an increase in performance and energy efficiency. With the solution according to the invention the optimal trajectory of an object moving on a controlled trajectory is found, which optimal trajectory the moving object can learn and which the moving object can follow. Thus for example, in executing a movement it is possible to learn the optimal stroke trajectory and optimal stroke speed.

In the solution according to the invention the immediate characteristic and/or built surroundings of a moving object is measured. In addition, at least one measuring datum is obtained from a magnetic field that is in connection with and/or in the proximity of the path of travel of the moving object, the magnitude and direction of which magnetic field is dependent on the structures in connection with and/or in the proximity of the path of travel of the moving object, such as e.g. in elevator use the distance from the elevator car of various metal reinforcements, electric wires and metal pipes of the floor levels of a building, and the various metal fittings in the elevator hoistway, as well as the elevator machine and the counterweight.

Figure 2:
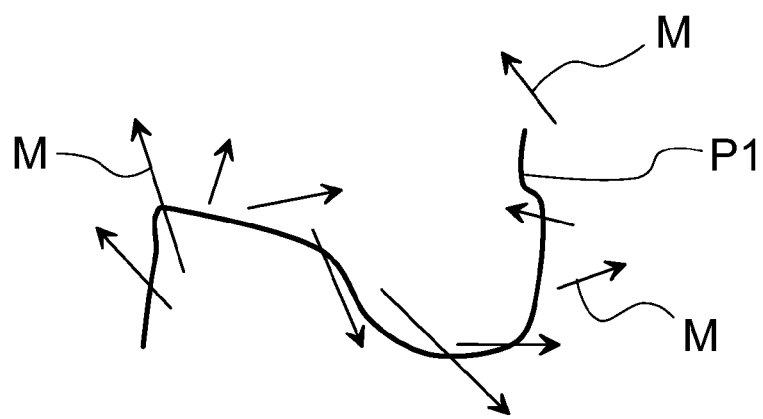
Figure 3:
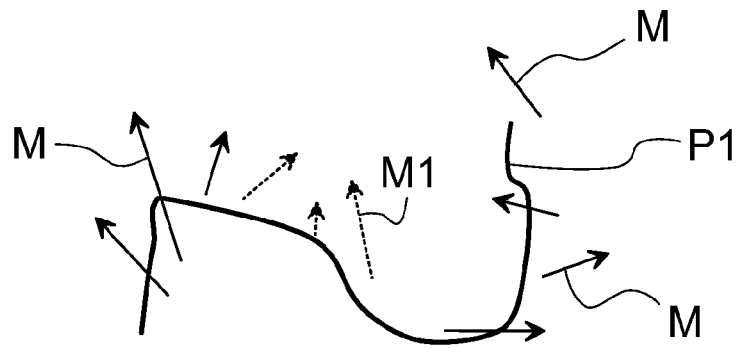
Figure 4:
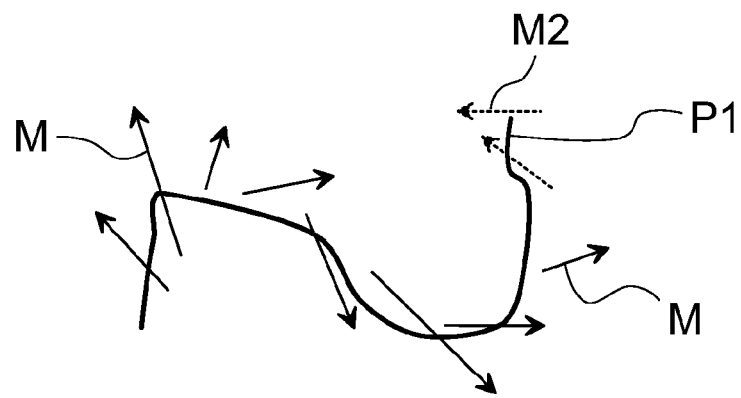
Figure 5:
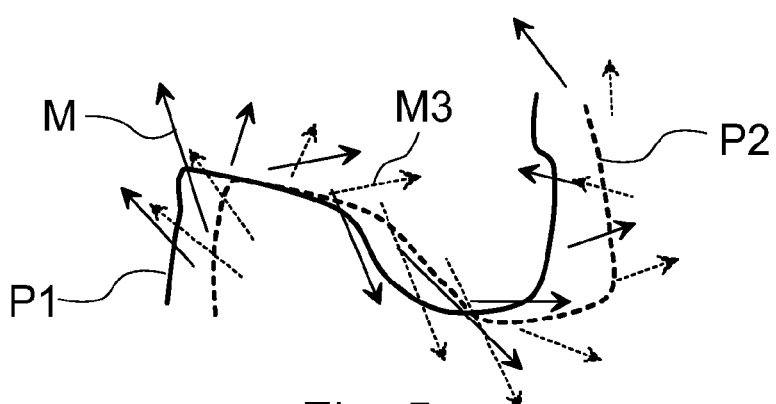
Figure 6:
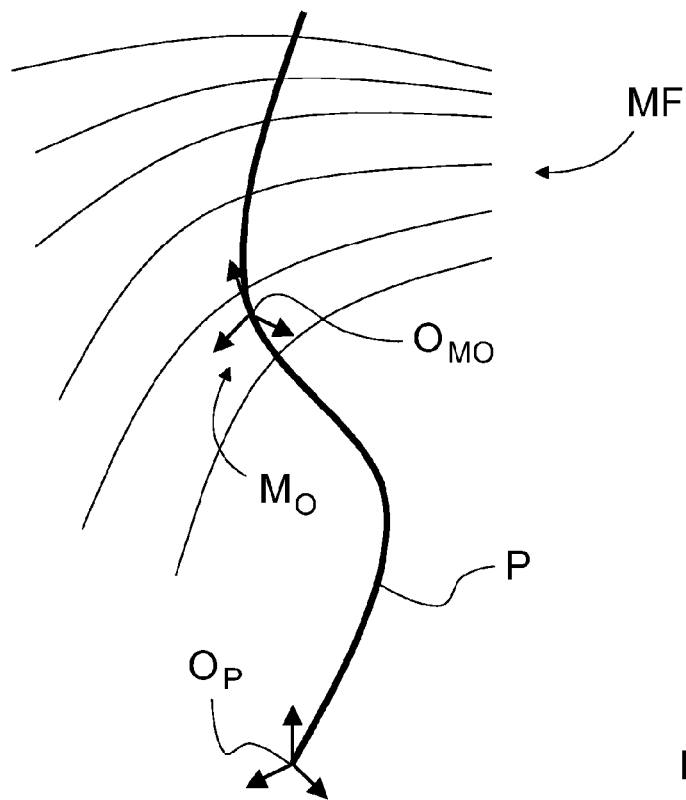
Figure 7:
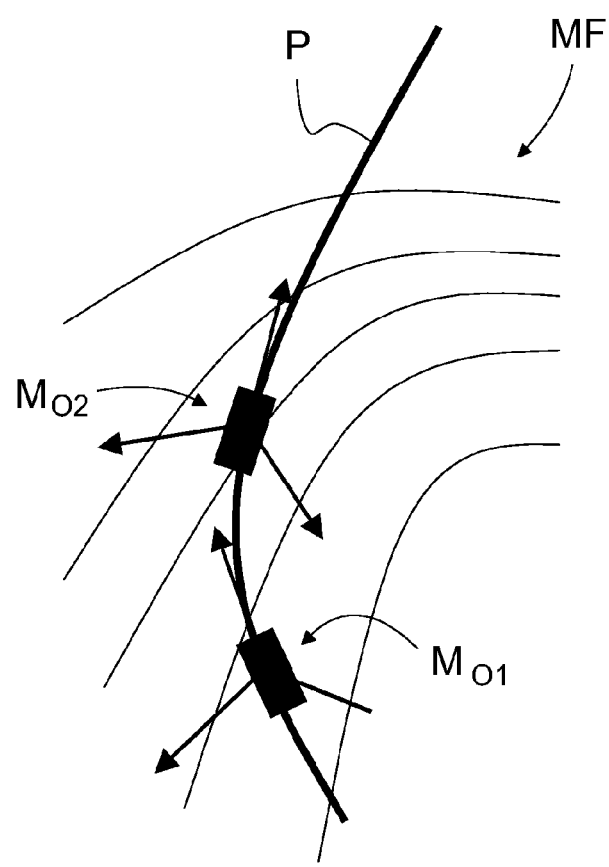
Figure 9:
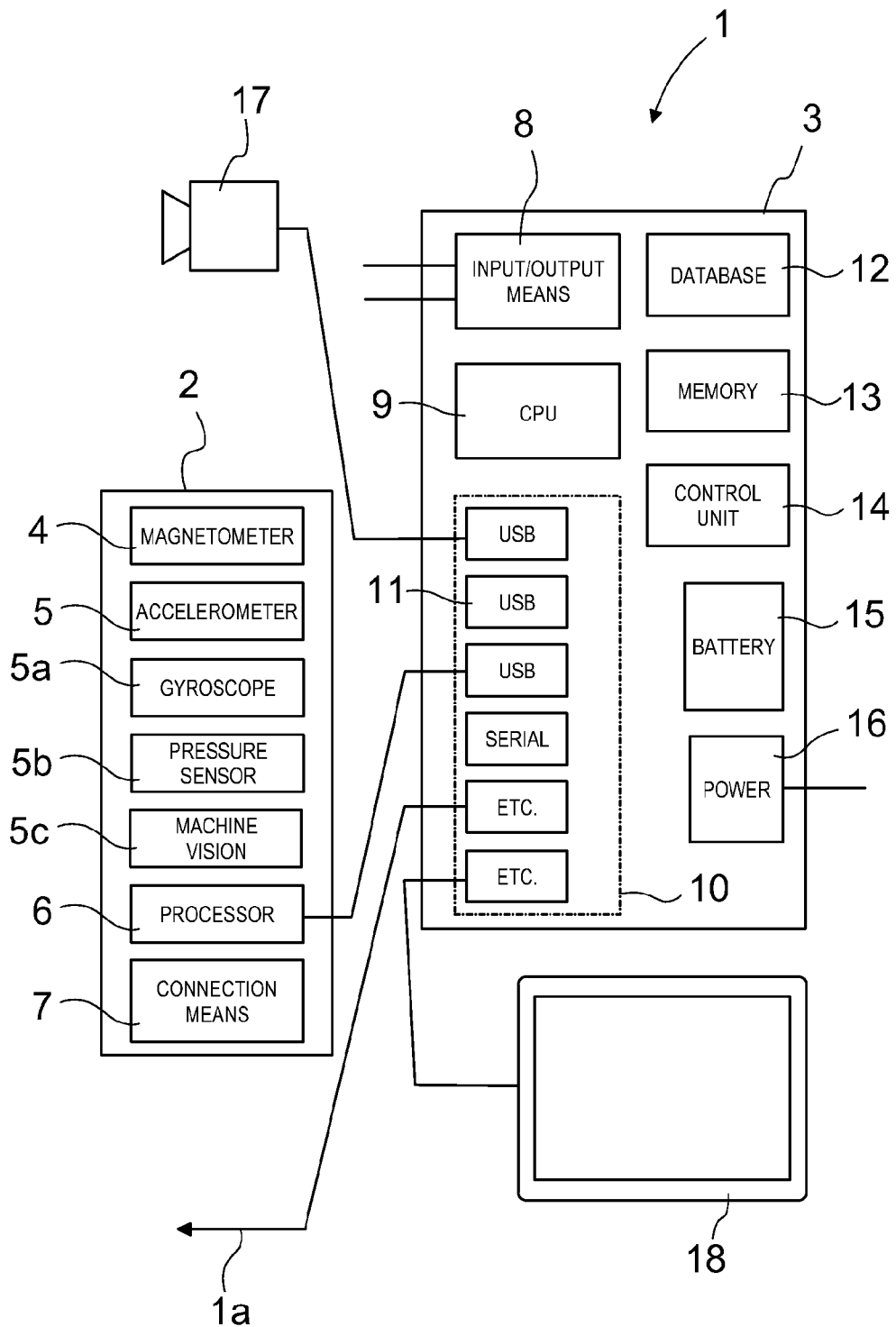
Figure 10:
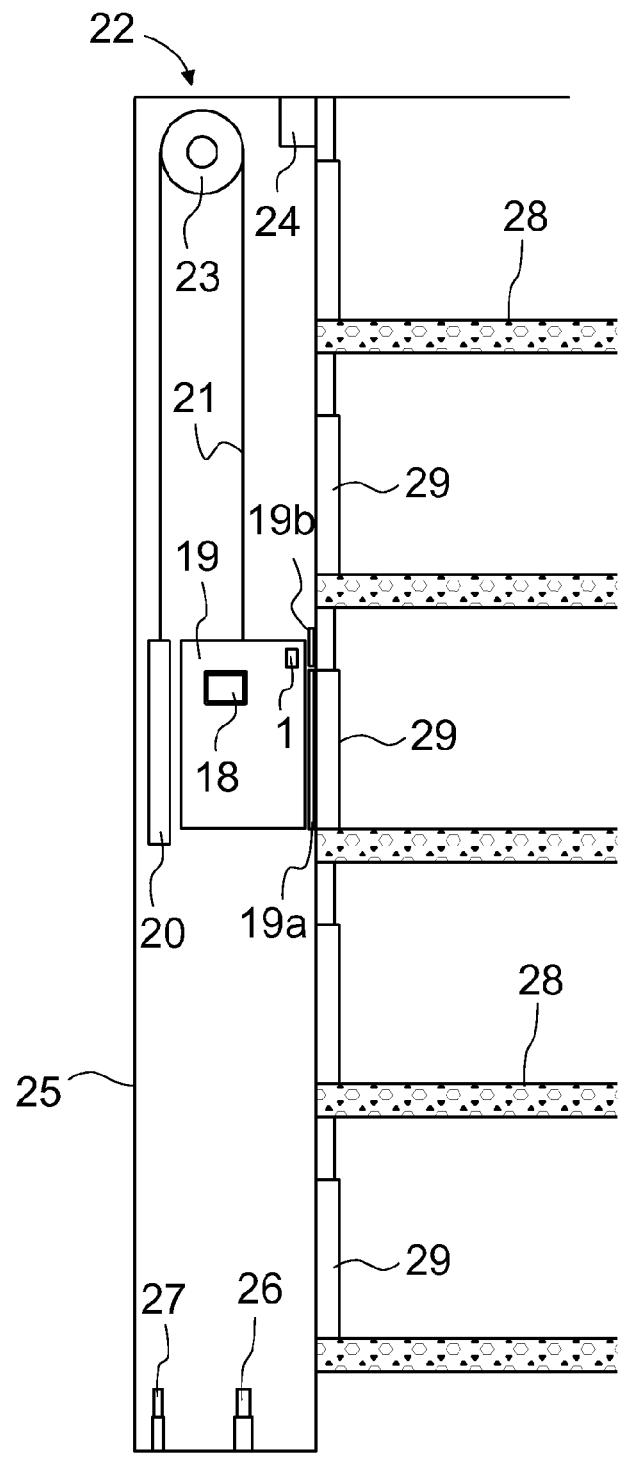
Figure 11:
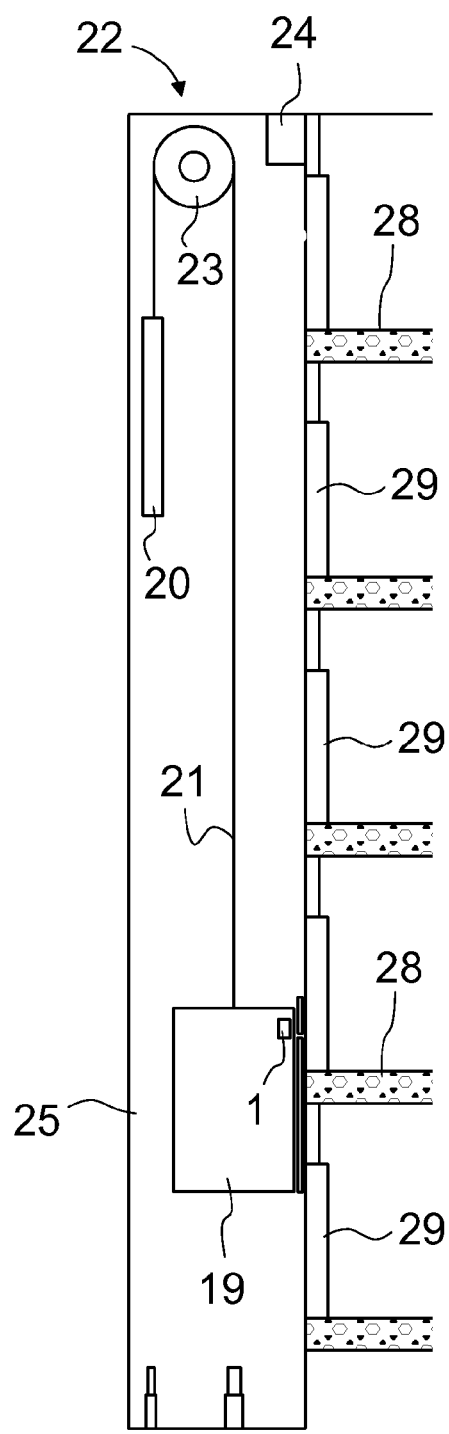
Figure 12:
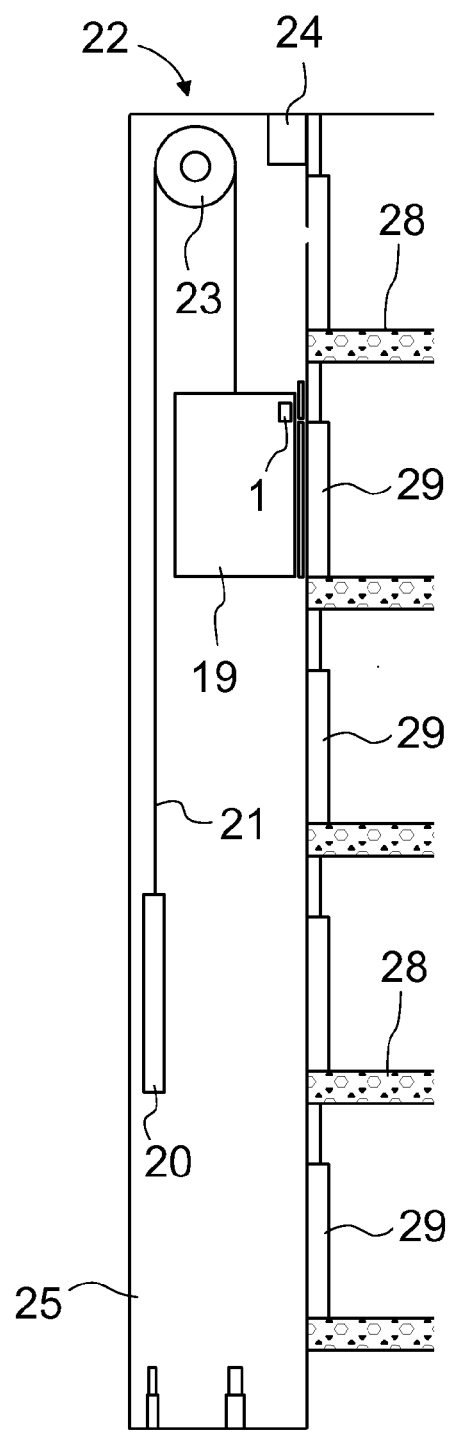
Figure 13:
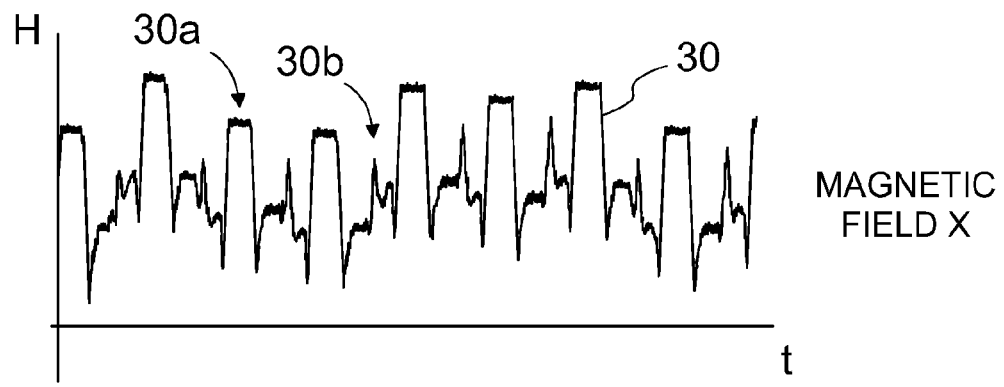
Figure 14:
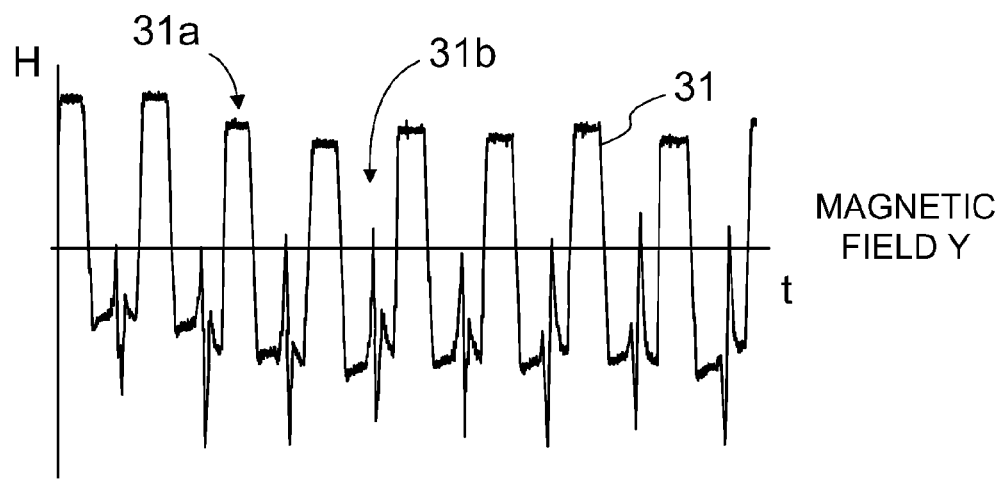
Figure 15:
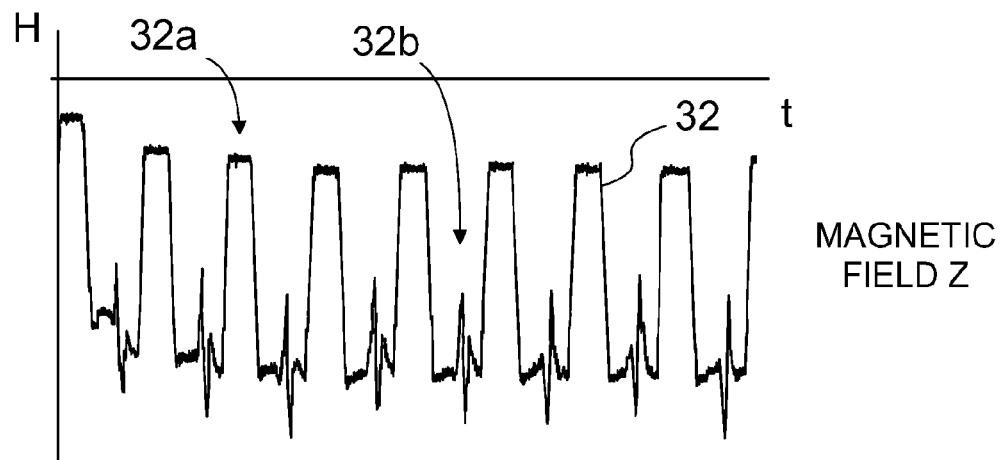

In the following the invention will be described in more detail by the aid of one example of its embodiment with reference to the attached drawings, wherein FIG. 1 presents a magnetic field acting at some point, e.g. at the origin, and its vector description, FIG. 2 presents a vector plurality formed by the vectors according to FIG. 1, i.e. a magnetic footprint on a determined first trajectory at a certain first moment in time, FIG. 3 presents the magnetic footprint, changed with respect to FIG. 2, at a certain second moment in time on the determined first trajectory according to FIG. 2, FIG. 4 presents the magnetic footprint, changed with respect to FIG. 2, at a certain third moment in time on the determined first trajectory according to FIG. 2, FIG. 5 presents a footprint according to FIG. 2 at a certain first moment in time and on a first determined trajectory, and also a second footprint at the same first moment in time but on a second determined trajectory, FIG. 6 diagrammatically presents the path of travel of a moving object in the magnetic field, FIG. 7 diagrammatically presents the object moving in the magnetic field at two different locations on its path of travel, FIG. 8 presents as a table the change situations and the nature of a change of a learned or taught footprint, FIG. 9 presents a diagrammatic and simplified view of one device to be used in the arrangement according to the invention, with peripheral devices, FIG. 10 presents a side view of one use of the arrangement according to the invention for determining the location of an elevator car in a first location of the elevator car, FIG. 11 presents a side view of one use of the arrangement according to the invention for determining the position of an elevator car in a second location of the elevator car, FIG. 12 presents a side view of one use of the arrangement according to the invention for determining the location of an elevator car in a third location of the elevator car, FIG. 13 presents a measuring curve of a measuring device of a magnetic field, in the direction X of the magnetic field, to be used in the arrangement according to the invention, FIG. 14 presents a measuring curve of a measuring device of a magnetic field, in the direction Y of the magnetic field, to be used in the arrangement according to the invention, FIG. 15 presents a measuring curve of a measuring device of a magnetic field, in the direction Z of the magnetic field, to be used in the arrangement according to the invention.

Although the embodiment of the method and of the arrangement for determining the location of an object moving along a controlled path of travel is presented in connection with elevators, the method and arrangement according to the invention can be applied also elsewhere than in elevator use, as already stated above. In this case the moving object can be e.g. a crane, a freight transport device or vehicle moving along a rail or track, or some other corresponding device, the exact location of which can be determined at a certain moment in time by the aid of a magnetic footprint obtained from measuring a magnetic field. An object moving along a controlled trajectory can also be an object, such as a tennis racquet or golf club, a spear, or some other item of sports equipment or some other moving object.

The path of travel, i.e. path of movement, i.e. the controlled path, or more briefly trajectory, in this context means a curve intersecting a three-dimensional space, which curve can be of any shape whatsoever, such as e.g. straight, round, elliptical or spiral. Connected to the trajectory is a piece, i.e. an object, moving along it essentially reciprocally or in one direction, i.e. an object, such as e.g. an elevator car moving along its guide rails. In this case the object has one degree of freedom of movement in relation to the trajectory, which is e.g. the distance s of the object from the defined starting point of the trajectory. The object can also rotate or turn at different points of the trajectory, but rotary movements are a function of the location s and therefore repeat in the same manner with different values of the location s.

The values of the different components of a three-dimensional magnetic field surrounding a trajectory can be measured e.g. with a magnetometer connected to the object and moving along with the object. The values of the components always repeat in the same manner with each value of the position s. If the values of the components of the magnetic field are measured in advance, the distance s of the object from the starting point of the trajectory at the time in question can therefore be determined as a result of later measurements by comparing the measurement results to measurement results obtained from before, e.g. in connection with a teaching run, self-learning or other corresponding procedure.

The internal state of an object on a trajectory or of a moving object in relation to the magnetic field acting on the object can change in a manner known in advance. The change of state can cause a detectable anomaly in the change in the magnetic field acting in the environment of the trajectory, which anomaly is differentiated from the characteristic magnetic field. By measuring the magnetic field acting in the environment of the trajectory, therefore, in addition to the location of the object, also certain recurrent and known changes in the internal state of the object can be deduced, e.g. the moment of braking of the moving object, and status data of the elevator door. In a corresponding manner changes of state of external objects in the proximity of the trajectory can also be deduced.

The aforementioned natural or characteristic deviation or distortion, i.e. anomaly, of the magnetic field can be statically different at different points of the trajectory of the moving object, but it can also change. Static differences in an anomaly are caused e.g. when an elevator car is the aforementioned moving object, by the fixed structures on the different floors of the building, which act on the characteristic magnetic field in the location in different ways to each other at different points of the trajectory, but at their own point always in the same way.

In addition to a static anomaly, a recurrent deviation that is always essentially similar and caused by the moving object or phenomenon itself or by an external factor acts on the magnetic field at a location, e.g. in elevator use the change in the magnetic field caused by the door operator of the elevator. Hereinafter this is called a primary dynamic anomaly.

In addition, changes occurring in relation to time act on the magnetic field at each location of the trajectory, which can be called e.g. time creep. This type of time creep can be a consequence e.g. of the changing of the environment of the moving object and of its path of travel. For example, in elevator use new electrical devices or other additional structures being installed on some floor of the building. Likewise, time creep can be a consequence of the changing of the moving object itself over time, an example of this type of changing is, still in elevator use, wear of the door motor of the elevator or wear of other devices, or also e.g. new adjustments made to the acceleration or rated speed of the elevator. Hereinafter this is called a secondary dynamic anomaly.

The three anomaly groups above act on the characteristic magnetic field at a location as an interaction with each other, i.e. as a summed effect, such that the moving object at each moment on its path of travel is in a total magnetic field jointly changed by the three anomaly groups. In addition, it can be stated that the joint effect that the joint effect of a static and a dynamic anomaly, and a change in the secondary dynamic anomaly acting on it, is configured in the solution according to the invention to function as a part of the self-adjustment of the arrangement, which is a different matter to teaching the arrangement or to self-learning in a startup run of the arrangement. A secondary dynamic anomaly is used according to the invention e.g. in the condition monitoring of the apparatuses belonging to the arrangement, because by the aid of it, e.g. in elevator use, both rapid and slower changes in the anomaly can be detected and thus it can be deduced e.g. that wear or some degree of malfunction of a door motor has started.

FIGS. 1-5 describe in more detail the connection with each other of the vector M, such as e.g. the resultant vector, the magnetic footprint and the magnetic map formed from the footprints. FIG. 1 presents the vector M and its components Mx, My and Mz describing a magnetic field at one trajectory point. According to FIG. 1, a natural magnetic field and the external factors affecting it, i.e. anomalies, in different locations at different moments in time and in different operational situations can be described with the vector M. The vector M describes the natural magnetic field of the earth and the interaction of a possibly occurring anomaly at a moment in time at a point. This type of point is hereinafter called a trajectory point. Correspondingly, a magnetic footprint is formed from one or more vectors M, when a measured plurality of vectors M, or some other identifier mathematically calculated from this plurality, is examined at one or more trajectory points x, y, z at the moment in time t. Further, a magnetic map forms from the magnetic footprints, when the footprints are examined at different points of time, at different trajectory points or in different operational situations. A magnetic map can be said to be a plurality of those magnetic footprints, the location of which is known. The position of the footprints is determined e.g. in connection with a teaching drive, self-learning or self-adjustment.

The origin of the vector M is physically attached e.g. to a magnetometer, i.e. there is a position origin, and from the magnetometer three different dimensions of the magnetic field can be measured as vectors Mx, My, Mz and the vector M of them. From the plurality of vectors M, or from the component vectors Mx, My, Mz in the direction of some of the coordinate axes a magnetic footprint is formed for each point of the determined trajectory.

Correspondingly, FIG. 2 presents a vector plurality formed by the vectors M according to FIG. 1, i.e. a magnetic footprint on a determined first trajectory P1 at a certain first moment in time t1. The plurality of vectors M has been measured at set intervals of time e.g. by the aid of a magnetometer in a number of trajectory points of the first trajectory P1.

FIG. 3 presents the magnetic footprint, changed with respect to FIG. 2, at a certain second moment t2 in time on the determined first trajectory P1 according to FIG. 2. The vectors M1 presented with dashed lines describe a change in the magnetic field acting on the trajectory P1. For example, when an elevator is the moving object, a door motor of the elevator being active, which function has produced the aforementioned change.

FIG. 4 presents the magnetic footprint, changed with respect to FIG. 2, at a certain third moment t3 in time on the determined first trajectory P1 according to FIG. 2. The vectors M2 presented with dashed lines now describe a change in the magnetic field acting on the trajectory P1. The change could have been caused e.g. by some external factor with respect to the moving object, for example, when an elevator is the moving object, some new active or passive component changing the magnetic field being installed in the building.

FIG. 5 presents the footprint according to FIG. 2 at the aforementioned first moment in time t1 and on the first determined trajectory P1 as well as a second footprint at the same moment in time t1 but on a second determined trajectory P2 close to the trajectory P1, which second determined trajectory is presented in FIG. 5 with dashed lines.

FIG. 6 diagrammatically presents one path of travel P of a moving object $M_O$ in the magnetic field MF prevailing in the environment of the path of travel. The location of the moving object $M_O$ on the path of travel P is determined e.g. by its distance from the starting point of the trajectory P, at which is the origin $O_P$ of the trajectory P. FIG. 6 also presents the origin $O_{MO}$ of the magnetometer fitted to travel along with the moving object $M_O$.

Correspondingly, FIG. 7 diagrammatically presents the object $M_O$ moving in the magnetic field MF at two different locations $M_{O1}$ and $M_{O2}$ of its path of travel P. The figure shows e.g. that the magnetic field MF appears different to the moving object $M_O$ at different points of the path of travel P, in which case therefore the values of the magnetometer moving along with the moving object $M_O$, measured from the magnetic field, are different to each other at different points of the path of travel P. Measurement of the location of the moving object $M_O$ is performed in the solution according to the invention in the coordinate system of the magnetometer moving along with the moving object $M_O$, wherein the origin of the coordinate system is therefore the same as the origin $O_{MO}$ of the magnetometer.

According to the invention the magnetic field acting in the environment of an accelerating, decelerating or stationary object moving on a determined, i.e. controlled, trajectory P, P1, P2, . . . PN is measured and on the basis of the measurement results a magnetic footprint determined from the component vector values Mx, My and Mz of the magnetic field that are acting in the environment of the object is calculated. A magnetic footprint describes the magnetic properties of the environment of the object, which properties are recurrent, repeatable and the changing of which can be verified by measuring and by calculating the result from the measured values obtained.

The measured and calculated magnetic footprints on the determined trajectory P, P1, P2, . . . PN can be connected on the basis of time or of some other property related to the determined, i.e. controlled, trajectory, such as on the basis of distance. The magnetic footprints can likewise be connected to information obtained from outside the determined trajectory P, P1, P2, . . . PN or to a control event, such as e.g. to acceleration information or image information.

When the magnetic footprints are connected in a suitable manner with equipment belonging to the arrangement, a magnetic map in three dimensions is achieved. When the time factor is taken into account and connected with the aforementioned magnetic map, a four-dimensional magnetic map according to the invention is obtained, comprising the dimensions x, y, z and t and composed of individual magnetic footprints on the trajectory of the object. The arrangement comprises equipment suited to the purpose for creating and updating the four-dimensional magnetic map. The magnetic map is used for, inter alia, determining the location of a moving or stationary object on a determined trajectory P, P1, P2, . . . PN, in which case all the dimensions acting on the travel path of the object can be observed from the magnetic map in terms of both time and of position.

A magnetic footprint or map can be used according to the invention for determining the location of an object such that the location tracking is not contingent e.g. on the moving of the object from the starting point of a trajectory P, P1, P2, . . . PN to the end point of the trajectory. By the aid of the individual magnetic footprints at different points of the trajectory, the location of the object on the determined trajectory can be freely determined.

By the aid of the magnetic map according to the invention and the sensor information and image information connected to its use, the location of the object on the trajectory can be reliably detected, even though individual or consecutive magnetic footprints on the trajectory are identical and likewise independent of the direction of movement of the object.

The solution according to the invention comprises controller means, monitoring means and actuator means for comparing a measured magnetic footprint to the properties of a footprint that has been learned, taught or otherwise acquired and recorded in memory. The controller means, monitoring means and actuator means are e.g. one or more computer programs, by the aid of which the status of each individual magnetic footprint, and the changes thereof, are comprehensively monitored. For example, a certain threshold value is set for a change, and when the known threshold value of the change is exceeded, an update of the magnetic map is started, in which case the changed footprint is recorded in the memory of the apparatus as a new reference value. In this way the magnetic map updates automatically with the new values of a footprint when the properties of an individual or of a number of magnetic footprints change, e.g. when a static, primary, secondary or other corresponding sphere of influence changes or when re-teaching the apparatus or for a corresponding reason, in which case the change in question therefore changes, for its part, the magnetic map. In the arrangement also other methods known in the art, such as e.g. automatic threshold setting, can be used for updating a magnetic map.

In elevator use, for example, among other things the run time elapsed from the departure floor to the stopping floor of an elevator car and the stopping time spent at the floor and also the run distance between the floors can be determined.

The use of a magnetic map is advantageous e.g. when the floor-to-floor distances of an elevator are of different dimensions, in which case the run times between floors differ from each other. Another example that can be mentioned is that of the express zones of elevators generally used in high-rise buildings, where the distance of a run between floors without stops can be 30-50 meters.

By means of a magnetic map according to the invention, e.g. when an elevator car is the moving object, the location of the elevator car at different floors can, owing to inter alia the time factor, be determined even if there were identical footprints at the aforementioned floors. This is enabled by the fact that owing to the aforementioned controller means, monitoring means and actuator means the system has all the time up-to-date information about at which point of the magnetic map the moving object traveling on its trajectory is at any given time. Various additional measuring means, such as acceleration sensors, gyroscopes, pressure sensors and other sensors are, if necessary, used as an aid in defining the location of the moving object. Odometers can also be used as an aid, e.g. when the solution according to the invention is applied in an object moving on wheels.

FIG. 8 presents a simplified table of the interpretations of learned or taught magnetic footprints, situations of change and the nature of the change in relation to time and position. The table is only an example and is not in any way complete. Apart from a footprint itself, a number of changes in the footprint can be utilized both in the basic task of the solution according to the invention, i.e. in tracking the location of a moving object, as well as in defining the motion state of the moving object, and also in learning and analyzing the characteristic operation of the moving object, e.g. in monitoring the condition of the moving object and of its components. Some changes are, however, non-recurrent and of a one-off nature or caused by unknown factors. It is endeavored to identify those changes and the situations resulting in them, and to recover from any disturbance as quickly as possible e.g. by the aid of the information obtained from sensors, For each overall situation presented by the horizontal rows A-I of FIG. 8, one example relating to elevators is given in the following for the sake of illustration. The situation can be, for example:

A) This situation represents the initial state of the elevator. In the situation the motion state and location of the elevator car are identified on the basis of a learned footprint. The elevator car is stationary or moving and no changes are identified in the footprint with respect to what is learned as a function of time or of position.

B) The elevator car is standing at a floor level and the doors of the elevator car as well as the landing doors are opening or closing.

C) The elevator car is being loaded with, or unloaded of, a crate of unknown magnetic material, e.g. permanent magnets.

D) The elevator car is standing at a floor and another elevator car of the neighboring hoistway is driving past.

E) Owing to wear of the door motor of the elevator car, a long-term change is detected in the footprint caused by operation of the doors when it is compared to the learned original footprint.

F) Temporary, e.g. owing to load, variations can be detected in the speed of the elevator compared to the speed that prevailed at the time of teaching.

G) Permanent variations in the speed can be detected of the elevator compared to the speed that prevailed at the time of teaching. These types of variations are e.g.

changes resulting from a change in motor output power, from wear or from slipping of the ropes.

H) Owing to servicing procedures on the car of a neighboring elevator, the neighboring elevator is stopped for the duration of one day at the entrance floor, and electrical devices are used in its car, which devices are detected as a change in the footprint both when moving and when stationary.

I) The door motor of the elevator car has been replaced with a new one that has different operation and gripping torque than the previous door motor.

As stated earlier, the situations described above are only examples of situations that can be detected with the solution according to the invention, and they do not in any way limit other operation and/or use of the solution according to the invention.

FIG. 9 presents a diagrammatic and simplified view of one measuring device 1 to be used in the arrangement according to the invention, with peripheral devices. The device 1 comprises e.g. measuring means 2, and a control unit 3 of the measuring means 2. The aforementioned measuring means 2 comprise at least a device 4 for measuring a magnetic field, such as a magnetometer, preferably a vector magnetometer or 3D magnetometer, which is configured to measure the magnetic field acting in a measuring location in vector format, i.e. as a vector value in three directions that are orthogonal with respect to each other, i.e. in the direction of the X, Y and Z coordinates. The directions X and Y are e.g. on the horizontal plane and at a right angle with respect to each other, and the direction Z is e.g. on the vertical plane and at a right angle with respect to both the X direction and the Y direction. The X and Y directions can just as well be e.g. at a right angle with respect to the direction of movement of the moving object and the Z direction can in this case be in the direction of movement of the moving object. Likewise the directions of the coordinate axes can be other than what is stated above.

The measuring means 2 preferably also comprise a device 5 for measuring acceleration, such as an accelerometer, which is configured to give the acceleration data of a moving object to the control unit 3 of the device 1, in which case e.g. information is obtained about whether the moving object being measured is in motion or stationary, and in which direction, e.g. upwards or downwards. In addition, essentially constant recurrent acceleration data can be used as an aid for the magnetometer 4 in determining the location of a moving object. From the viewpoint of the operability of the arrangement, the measuring device 5 of acceleration is not necessary, but it is however an advantageous auxiliary means. The measuring means 2 can also comprise the aforementioned one or more gyroscopes 5a and one or more pressure sensors 5b, the measured sensor information of which is used, in addition to normal operation, also e.g. as an auxiliary means for learning to find the optimal trajectory of a moving object. The attitude, and change in attitude, of an object moving on a controlled trajectory is measured with a gyroscope, e.g. a rotation in attitude or e.g. the attitude of the head of a golf club, and e.g. the height information of an elevator car is measured with a pressure sensor.

The measuring means 2 can further comprise a machine vision arrangement 5c, which is connected to be a part of the solution according to the invention. The sensor information measured and processed by the machine vision arrangement can be used in many embodiments of the invention. For example, by the aid of machine vision the precise hoistway space is seen in elevator solutions and the location of the elevator car in the hoistway can also be deduced. Correspondingly, by the aid of machine vision the optimal trajectory in sports performances can be determined and it can be compared to the trajectory made in a teaching situation.

The measuring means 2 also comprise processing means 6 for processing the measured values of a magnetic field and acceleration values as well as the aforementioned measured sensor information and converting these into a suitable format for further processing, e.g. into vector-format position coordinates, and also communication means 7 for sending the measured values converted into a suitable format to the control unit 3 of the measuring means for further processing, to which control unit the measuring means 2 are connected e.g. via a USB port.

The control unit 3 of the measuring means can be a separate unit or it can be integrated directly into the measuring means 2. The control unit 3 comprises at least a user interface 8, via which information can be entered into the control unit 3 and information can be read from the control unit 3. In addition, the control unit 3 comprises a processor unit 9 for processing the measuring data received from the measuring means 2 and input/output means 10, which comprise various ports 11, such as USB ports, serial ports and other necessary ports, e.g. a port for connecting the control unit 3 to the control system and operating system of a moving object. The control unit 3 further preferably comprises a database 12 and a memory 13 for recording and storing measured and learned information as well as other information, and also control means 14 for controlling the measuring means 2. The measuring data is recorded in the database 12 and/or in the memory 13 e.g. according to the sampling frequency. The control unit 3 also comprises a power source, which can be a separate power source 16 connected to an external power source or an own power source 15 of the control unit, e.g. an accumulator or battery. FIG. 9 presents a solution comprising an external power source 16 and, as a backup power source, an own power source 15.

The control unit 3 also comprises ports 11 and means for connecting an external camera 17 to the arrangement, in which case image data given by e.g. a digital still camera or video camera can be utilized together with the measuring data given by the measuring means 2. By the aid of the camera 17 e.g. in elevator use it can be checked whether a door of the elevator or of the floor level is open or closed. The camera 17 can also be used in connection with the machine vision arrangement 5c. In addition, the control unit 3 comprises means for connecting an external display 18 to the control unit 3. The control unit 3, e.g. in elevator use, can be programmed to show on the display 18 floor-specific information, when the elevator car approaches the floor in question. The measuring means 2 are configured to measure the location of the elevator car continuously and when the elevator car approaches an interesting floor, the information connected to the floor in question, e.g. information about the businesses on the floor, a restaurant menu, et cetera, is shown on the display 18.

The measuring device 1 and at least its measuring means 2 to be used in the arrangement according to the invention are fixed to travel along with the moving object to be measured and the control unit 3 is connected to the control system of the moving object, such as of an elevator, e.g. via a communications cable 1a or wirelessly. The measuring data received from the measuring means 2 and transmitted with the control unit 3 is processed in determining the location of the object with an accuracy measured in millimeters, or even better than that, e.g. if so required such that the location of an object on its controlled trajectory is determined with an accuracy of 0.1-10 mm. This is possible when the sampling accuracy is e.g. 1000 Hz, in which case when the object, e.g. an elevator car, is moving at a leveling speed of 0.1-0.2 m/s, the smallest positioning accuracy will be 100/1000=0.1 mm. In this way the control system of the moving object receives the precise position information of the moving object continuously as a function of time.

FIGS. 10-12 present one use of the arrangement according to the invention for determining the location of a moving object, such as an elevator car 19, when for illustrative purposes in each figure the elevator car 19 is in a different position in the elevator hoistway 25. The elevator car 19 moves in the elevator hoistway 25 along a determined, i.e. controlled, vertical trajectory, generally guided by metallic guide rails. The elevator car 19 is suspended on elevator ropes 21, which elevator ropes 21 pass around e.g. a traction sheave 23 of the elevator machine 22 disposed in the top part of the elevator hoistway 25 and return downwards to a counterweight 20, which moves in the elevator hoistway 25 at the same time as the elevator car 19 but in the opposite direction. In this arrangement the moving object is the elevator car 19, and the device 1 measuring its location, or at least the measuring means 2 of the device 1, is/are configured to move along with the elevator car 19.

In the top part of the elevator hoistway 25 is the elevator machine 22 with traction sheave and other necessary devices as well as e.g. the control cubicle 24 of the elevator, said cubicle having devices comprising, inter alia, the operating system and control system of the elevator. Correspondingly, in the bottom part of the elevator hoistway 25 are, inter alia, buffers 26 and 27 for the elevator car 19 and for the counterweight 20, said buffers containing metal. In addition, each floor level 28 has elevator doors 29, with their own additional devices, for the floor levels, said doors containing metal. All the aforementioned devices and structural components act on the magnetic field at the location in question in their own environment. In addition, the metal reinforcements of the floor levels 28 and walls of the building as well as of the roof and floor each act in their own individual way on the magnetic field at the location. In this way the characteristic environment, with metals and other materials, of the elevator car 19 causes a certain measurable distortion in the magnetic field of the earth in connection with the elevator car 19.

The above devices and structural components act on the magnetic field statically, but in addition the effect of the doors 19a and door operator 19b of the elevator car 19 and the dynamic effect of the counterweight 20 and the hoisting ropes 21 of the elevator on the magnetic field must be taken into account. Nevertheless, the effect of the doors 19a and door operator 19b of the elevator cars 19 on the magnetic field is essentially the same on all floors. On the other hand, the effect of the counterweight varies. The counterweight 20 moves in the elevator hoistway 25 in the opposite direction to the elevator car 19 and in the situation according to FIG. 10 is essentially at the point of the elevator car 19, but in the situation according to FIG. 11 is clearly above the elevator car 19 and in the situation according to FIG. 12 is clearly below the elevator car 19. There is also metal, among other things, in the counterweight 20 and in the hoisting ropes of the elevator, which metal affects any magnetic field near them. When the counterweight 20 is, according to FIG. 10, essentially at the height of the elevator car 19, both the counterweight 20 and the hoisting ropes 21 going from the counterweight to the hoisting machine 22 act on the magnetic field measured by the measuring device 1. Correspondingly, when the counterweight 20 is according to FIG. 11 clearly above the elevator car 19, the effect of the counterweight 20 and of the hoisting ropes 21 leaving it on the magnetic field acting at the point of the elevator car 19 is minor. Further, when the counterweight 20 is, according to FIG. 12, clearly below the elevator car 19, the effect of the counterweight 20 on the magnetic field acting at the point of the elevator car 19 is minor, but the hoisting ropes 21 between the counterweight 20 and the hoisting machine 22 of the elevator act on the magnetic field at the point of the elevator car 19.

In the situation according to FIG. 11, the elevator car 19 is between floor levels 28, in which case the effect of the point in question on the natural magnetic field at the location is different than at the point of the floor level 28. In this case, e.g. the landing door 29 and the metal reinforcements in the floor of the floor level 28 distort the natural magnetic field in the proximity of the elevator car 19 at the location in question in a different way than if the elevator car 19 were exactly at the point of the floor level.

Owing to all the above structures and electrical wires and other points of the building and of the elevator deflecting the natural magnetic field, the direction and magnitude of the magnetic field inside and/or in the proximity of the elevator car 19 is dependent on the location of the elevator car 19 in the elevator hoistway 25. This type of prevailing magnetic field characteristic to a building and resulting from other structures than separately installed position sensors or corresponding can be thought of as forming a plurality of magnetic footprints, by comparing real-time measured magnetic magnitudes to which it is possible to determine the exact location and the speed of the elevator car 19 at different moments in time without separately installed position sensors according to prior art, such as magnets or RFID identifiers. At its best the magnetic map thus formed is unambiguous in the different location positions of the elevator car 19, in which case it determines the location of the elevator car 19 unambiguously. At its worst, on the other hand, there are harmonics in the map, in which case a similar magnetic field is repeated in different location positions. This is not in practice, however, a problem because generally the harmonics are not simultaneously in all three directions of measurement, i.e. in the directions of the X, Y, Z coordinate axes, and additionally the location of the elevator car 19 is monitored in terms of time, in which case the location can be verified, despite the harmonics, on the basis of time.

FIGS. 13-15 present the measuring curves to be used as magnetic footprints in the method and in the arrangement according to the invention, said measuring curves being produced by the measuring means 2 of the device 1 for measuring the magnetic field, in the directions of the X, Y, Z coordinates of the magnetic field. The measurement results are presented as curves, of which curve 30 describes the measurement results in the direct X of the magnetic field, curve 31 describes the measurement results in the direct Y of the magnetic field, and curve 32 describes the measurement results in the direct Z of the magnetic field. In FIGS. 13-15 the higher and more even points 30a, 31a and 32a of the curves functioning as magnetic footprints describe the elevator car 19 at floor levels 28 and the lower and simultaneously more uneven points 30b, 31b and 32b describe the elevator car 19 between floor levels 28.

The curves 30-32 describe e.g. the strength H of the magnetic field as a function of time t. The curves 30-32 could just as well present the density of the magnetic flux as a function of time t or some other special magnitude describing a magnetic field as a function of time. The curves can be presented also as a function of position, instead of time, or e.g. as a function of the status of the overall situation acting in a location. The magnetic field is thus different, e.g. at different points of the elevator hoistway 25. Likewise, the magnetic field can be different in the same location, but at different moments in time. The greater the sampling frequency used, the more accurately the location of the elevator car 19 can be measured. If the magnetic footprint presented by the measuring curve 30 produced by one coordinate direction, e.g. the direction X, is not sufficient for an adequately clear definition of the location of the elevator car 19, the measuring curves 31 and 32 produced by the other two coordinate directions Y and Z can be used as an aid, in which case the determination of the location of the elevator car 19 is extremely reliable, because all three coordinate directions X, Y and Z always have magnetic differences with each other to an adequate extent.

In the method and arrangement according to the invention, measurement of the acceleration of a moving object, such as of an elevator car 19, can also be connected by the aid of a device 5 for measuring acceleration to the magnetic measurement, as can also the processing of image information produced by a camera 17, in which case, in addition to the location information and speed information obtained on the basis of measurements of the magnetic field, it can be deduced in which direction the moving object is moving and also e.g. whether the doors 19a of the elevator car 19 or the landing doors 29 are open or closed. With the aid of the camera 17, also other changes than the status of the doors can be observed. For example, the floors, ceilings or walls of the floor levels 28 of the building can be different colors or patterned in different ways on different floors. The different patterns, or e.g. the number of the floor level in question on the inside of the landing door, can be identified with the camera 17. By the aid of the camera 17 it can be observed directly which floor it is according to this and the information can be used as an aid in defining the floor level 28 and location. The information given by the camera 17 can be used exclusively for defining the floor level 28 or as an aid with other information, e.g. the information given by the magnetometer 4, if e.g. the footprint data to be obtained from the magnetometer 4 is not for some reason sufficiently unambiguous.

The method and arrangement according to the invention are based on the charting and measuring, mainly in 3D vector format in the directions of the X, Y and Z coordinate axes, of the aforementioned magnetic changes caused in the magnetic field of the earth by the structures naturally present in the environment of the path of travel of the elevator car. In the solution according to the invention separate magnetic or other corresponding sensors or detectors are not typically placed in the elevator hoistway or more generally in connection with the trajectory of a moving object, but instead the solution according to the invention is based on the magnetic field acting in the characteristic environment of the moving object. In addition, the movement of a moving object, such as of an elevator car 19 in the example case, induces dynamic components in the magnetic field and the elevator machine also, for its part, changes the magnetic field. That being the case the magnetic map formed and the magnetic footprints 30-32 to be obtained from it are different in different buildings, on different floors and in different elevators.

In the method and arrangement according to the invention, variations in the magnetic field in the different locations of the elevator car 19 are utilized and by comparing the magnetic map, created by measuring with the measuring means 2, and the magnetic footprints 30-32 therein, such as the measured values of the vectors of the magnetic field obtained in relation to the different coordinate axes X, Y, Z, a solution has been achieved with which it is possible to measure quickly, accurately and reliably the location of the elevator car 19 in the elevator hoistway 25 at a certain moment in time without measuring sensors or sensors being separately disposed in the elevator hoistway 25.

The reliable location tracking of a moving object, such as the location tracking of an elevator car 19 in an elevator hoistway 25, is implemented at first with an initialization of the arrangement, which is performed either before actual operation or at the start of operation of the object or also during operation.

In connection with an initialization the object, such as an elevator car 19, is moved on the aforementioned controlled trajectory and at points significant to the object in terms of either position and/or time on the aforementioned controlled trajectory the magnetic field acting on the object is measured with the means (4) for measuring a magnetic field and the measurement results obtained are recorded as magnetic footprints in the memory 13 of the arrangement. A point significant in terms of position is, for an elevator car 19, e.g. the point of the floor levels, so that the elevator car is later able to stop at the point of the correct floor level. The same point can also be determined in terms of time, e.g. from the main floor upwards at constant speed of the elevator. In this case the floors that appear similar in their magnetic footprints can be distinguished by the aid of time measurement. Correspondingly, in sports performances, such as in tennis strokes or golf strokes, the significant points of a stroke trajectory might be easier to distinguish from each other when defined in terms of time, e.g. sampling frequency intervals, than detection points of the path of movement based on position.

In connection with an initialization a large plurality of magnetic footprints is formed and essential matters from the viewpoint of the operation of the arrangement are taught. During initialization the moving object, e.g. an elevator car 19, is taught to detect its own location in the elevator hoistway 25. Teaching is implemented either as a teaching drive or as self-learning. In connection with teaching, the magnetic footprints of floor information are collected and taught to the elevator, or the elevator learns those trajectory points of the controlled trajectory that have significance from the viewpoint of operation of the elevator, e.g. the locations of the floor levels in the correct sequence in relation to the controlled trajectory. Correspondingly, e.g. in sports performances, such as in tennis strokes or golf strokes, the optimal stroke trajectory in relation to time, location and speed is learned.

According to one embodiment, the teaching is performed by first constructing a magnetic map with footprints 30-32, in connection with which the elevator car 19 is driven e.g. from the basement floor to the topmost floor of the building and at the same time at least the characteristic magnetic field acting on the elevator car 19 is measured, with device 4 for measuring a magnetic field, in three different coordinate directions, i.e. in the directions X, Y and Z. At issue, thus, is a magnetic field that is not acted upon by any types of separate components intended just for determining location, such as e.g. position sensors or separate sensors, but instead is acted upon only by the own structures of the building and of the elevator, which structures would also exist even without determination of the location of the elevator car 19.

When the elevator car 19 is at some floor level 28, information about the floor level 28 in question is entered into the measuring device 1 via the user interface 8. This procedure is followed for each floor level 28.

As mentioned above, the teaching can also be implemented automatically e.g. by assuming that the elevator car 19 starts its movement from the first floor and drives evenly upwards to the top, or performs the run in reverse. Learning is also possible as self-learning on a so-called random run, in which case an elevator car 19 is arranged to drive for as far in the elevator hoistway 25 until the arrangement has detected the same number of different magnetic footprints as the number of floors, of which the arrangement places the floor level 28 in the correct sequence e.g. by the aid of the measuring data received from the device 5 for measuring acceleration. The number of floor levels 28 is given to the control unit 3 of the arrangement by the aid of a user interface 8.

In addition, the magnetic map and magnetic footprints 30-32 that are the reference basis are updated in connection with operation of the elevator, e.g. in connection with each run or at set intervals. In this case the device 4 for measuring a magnetic field detects in the magnetic field e.g. changes resulting from subsidence of the building and structural changes that have occurred in the immediate environment of the elevator car 19. In this case the arrangement reacts mainly to long-term changes in the magnetic field.

In the teaching phase and during normal operation status data for the door 19a of the elevator car 19, i.e. whether the door 19a is open or closed, is obtained from the camera 17. For example, when the door 19a of the elevator car 19 is open it is known that the elevator car 19 is at a floor level 28, after which the magnetic footprint of the floor level in question is measured. Status data for the door 19a of the elevator car 19 is also received from the magnetometer 4, as explained earlier. At its best a magnetometer 4 offers a way of ascertaining the state of the elevator car 19 at each moment of time, in which case therefore from the state of the elevator car 19 e.g. the location, speed and the position of the door 19a of the elevator car 19 are ascertained.

Correspondingly, after the teaching, in the location tracking phase, i.e. in connection with normal operation of the elevator car 19, the essentially real-time measurement results converted into coordinates of the device 4 for measuring a magnetic field, i.e. real-time magnetic footprints 30-32, are compared to the magnetic map formed in connection with teaching and possibly updated thereafter and to the magnetic footprints 30-32 therein for ascertaining the floor information and/or accurate position information of the elevator car 19. In the comparison various methods known in the art can be used in connection with a magnetic map and with operation for interpreting the correlations of measured signals.

According to the invention e.g. approx. 50-400, suitably e.g. approx. 100-200 and preferably e.g. approx. 150 samples per second are taken in the teaching phase with the device 4 for measuring a magnetic field as reference footprints 30-32, but also other sampling frequencies can be used. As stated above, if necessary a sampling frequency of up to 1000 Hz can be used. The higher the sampling frequency, the more accurate is the measuring precision of the location of the elevator car 19. All the samples, i.e. measurement results, taken for reference footprints 30-32, are taken in all three dimensions, i.e. in the directions of the X, Y and Z coordinates, and recorded in the memory 13 of the measuring device 1 and/or in a database 12.

Correspondingly, in the location tracking phase the real-time measurement result in the directions of the different coordinate axes X, Y, Z are compared to the reference footprints 30-32, recorded earlier in the memory 13 of the measuring device 1 and/or in the database 12, for a certain interval of time, e.g. an interval of one second, in which case in each of all three coordinate directions are e.g. 150 consecutive samples to be compared when the sampling frequency has been 150 samples a second. The comparison is performed e.g. by the aid of the processor unit 9 of the measuring device 1 e.g. with the method of least squares or with another corresponding method giving an adequately reliable comparison result. As a result of the comparison the location at that time of the elevator car 19 in the elevator hoistway 25 is determined.

The arrangement according to the invention also comprises means for self-adjustment of the arrangement. In this case, if changes occur in the environment of the moving object that act on e.g. the magnetic field, the arrangement is able to adapt to it itself such that optimal self-adjustment is the objective.

With the solution according to the invention also the behavior of the structural components of the elevator can be monitored and e.g. gradual wear and malfunction, which can be addressed in good time owing to the solution according to the invention. By comparing real-time measurement results and reference footprints 30-32 e.g. changes occurring in the operation of the door operator 19b of the elevator car can be seen already before the door operator 19b fails so badly that a longer-term service break is imposed on the elevator. Likewise relatively modest changes occurring in the movement, such as in the acceleration or braking, of the elevator car 19, can be seen by comparing real-time measurement results and reference footprints 30-32 in good time before possible larger defects, in which case the elevator can quickly, and with low costs, be brought into normal operating condition without larger repairs and operational disruptions.

The solution according to the invention can be applied also to ascertaining and observing other different types of paths movement, as is already mentioned above. In this case the measuring device 1 can at first be taught e.g. the optimal path of movement with movement speeds and the measuring device 1 according to the invention is configured to monitor the path of movement and movement speed. In these cases the arrangement according to the invention can be used e.g. for teaching various sports performances requiring correct trajectories, such as e.g. tennis strokes and golf strokes, wherein a magnetic footprint is formed from the rotary motion of the strokes.

For example, in teaching a tennis stroke or golf stroke, a measuring device 1 according to the invention can be used in the solution according to the invention as a wristband, which is provided with e.g. means 4 for measuring a magnetic field and possibly also with one or more devices 5 for measuring acceleration and is configured to measure e.g. the path of movement and movement speed of a stroke. Also machine vision 5c can be used as an aid for measuring and recording stroke performance. When the person making the stroke or the trainer is content with the performance brought about by the aid of a stroke, the path of movement and the movement speed used for the stroke can be recorded in the memory 13 of the measuring device 1 as a so-called model performance, which corresponds e.g. in an elevator embodiment to learning the locations of the floors. After this the person making the stroke receives information from the measuring device 1 about his/her practice shots and how near they have been to the recorded model performance and also how the following stroke should be corrected if the stroke did not correspond to the model performance.

In practice e.g. a person practising a tennis stroke is not necessarily able to stay in exactly the same location nor in quite the same attitude, in which case the tennis racquet in his/her hand does not move in the different strokes on precisely the same trajectory in relation to the magnetic field of the earth, even if the trajectory around the shoulder joint were to be the same, because now the shoulder joint has itself moved in relation to the magnetic field of the earth. This deficiency is corrected by arranging for the person practising their own local magnetic field and coordinate system for learning and adaptation e.g. in an environment in which there is no optimal trajectory specified beforehand. In this case e.g. the person practising has a magnetic flux belt, which remains always at the same distance from the shoulder joint of the person practising, even if the shoulder joint were to move on different occasions in different ways in relation to the magnetic field of the earth. The measurement result produced by the magnetic field of the earth can in this case be eliminated and the device 1, on the wrist of the person practising, for measuring a magnetic field is configured to measure movement of the arm in relation to the magnetic flux belt on the chest or pelvis of the person practising.

The arrangement comprises means for taking into account various environmental effects, such as wind, lighting and temperature, and for eliminating the detrimental effect caused by them, e.g. by adjusting the settings of the magnetic flux belt, in which case the trajectory can be optimized by adjusting the magnetic field of the magnetic flux belt to take into account the environmental effects. In this case, despite different environmental factors, an optimal trajectory for a model of a stroke performance is always obtained. Since a single optimal trajectory common to all prevailing conditions and e.g. suited to different people does not exist, by aid of the invention an optimal trajectory can be configured for the environment, users and situation prevailing at that moment in time with the controls of the magnetic flux belt using as an aid additional measuring means, such as an acceleration sensor 5, a gyroscope 5a, a pressure sensor 5b, machine vision 5c, et cetera.

It is obvious to the person skilled in the art that the invention is not limited solely to the example described above, but that it may be varied within the scope of the claims presented below. Thus, for example, the invention can be applied to determining the exact location of many types of moving objects, as is already mentioned above. In this case other possible moving objects are e.g. cranes moving on their path of travel, freight transport devices or vehicles moving along a rail or track, or some other corresponding devices moving along a controlled trajectory.

It is also obvious to the skilled person that the solution according to the invention can be applied also to other devices than those moving along a controlled trajectory. Thus, for example, the solution according to the invention can be used for driving to a specific location, such as to a parking place in a multi-storey car park. The concrete reinforcements in the concrete structures of a multi-storey car park are also individual, in which case a vehicle can be taught by the aid of the device according to the invention e.g. to reverse into exactly the correct parking square and into exactly the correct position in the parking square.

It is also obvious to the person skilled in the art that in addition to locating moving objects on a linear trajectory, also e.g. the attitude of rotating objects at different moments of time can be determined with the method and arrangement according to the invention. This can be implemented e.g. by placing a measuring device according to the invention on the rim of a rotating object.

It is also further obvious to the person skilled in the art that in the solution more than one magnetometer or corresponding device for measuring a magnetic field can be used, e.g. two, three or even more. When, for example, the interaction of two magnetometers is known, stereo magnetometry can be brought about, the reliability and accuracy of which is better than when using just one magnetometer. For example, when an elevator car is the moving object, at the top of the front part of the elevator car can be one magnetometer and at the bottom of the rear part another magnetometer.

It is also obvious to the person skilled in the art that in addition to the natural magnetic field acting on the path of travel of the moving object, a special sensor system that supplements or improves the measurement result of the magnetometer can be disposed for acting on the path of travel. In this case, e.g. when an elevator is the moving object, permanent magnets or other sensors can be disposed on the floor levels of the elevator and/or in other suitable points in the elevator hoistway, which sensors each individually act on the magnetic field to be measured on the path of travel of the elevator car and via that on the magnetic footprint.

The invention claimed is:

1. A method for determining a location and/or speed of an object configured to move along essentially a same controlled trajectory in a magnetic field deflected by a static and/or dynamic change, the method comprising the steps of:

a measuring device measuring at least the magnetic field acting on the object in its different locations, the measuring device being fitted in connection with the object, and comprising at least means for measuring the magnetic field; and forming a magnetic footprint describing the magnetic field acting on the object in its different locations from measuring data received from the measuring device;

recording the magnetic footprint in a memory of an arrangement for later use before actual operation of the object, wherein before actual operation or during operation an initialization is performed, wherein the object is moved on the controlled trajectory, and at points determined by either position and/or time on the controlled trajectory the magnetic field acting on the object is measured with the means for measuring a magnetic field and the measurement results obtained are recorded as magnetic footprints in the memory of the arrangement, in addition to measuring the magnetic field, additional measuring means at essential points of the controlled trajectory from viewpoint of the operation of the object are optionally used as an aid for measuring other sensor data of the object in its environment at that moment and/or the time used data, and measurement results obtained from measuring the other sensor data are recorded in the memory of the arrangement, from the measurement results obtained at the aforementioned points determined by either position and/or time on the controlled trajectory, position data of the object in relation to the controlled trajectory and optionally time data to be connected to the position data are formed by fixing the measurement results to the determined measuring locations of the controlled trajectory, and during operation, the movement and environment of the object is measured with the same means for measuring a magnetic field as during the initialization, and optionally with the same additional measuring means as during the initialization, and the measurement results obtained are compared to optimal sensor data formed from the measurement results recorded in the memory of the arrangement during the initialization and recorded in the memory, as well as to measured data about the environmental conditions of the object, and wherein the method further comprises determining locations of the object during the operation and detecting changes occurring in the operation in relation to location, motion state and condition of the object by comparing real-time measurement results obtained during operation of the object to the optimal sensor data formed from the measurement results recorded in the memory during the initialization.

2. The method according to claim 1, wherein after learning, self-adjustment, the use of an external model, initialization or a corresponding function, at least the location of the object is determined by measuring with the means for measuring a magnetic field, in the direction of the three coordinates X, Y, Z and in essentially real-time, the magnetic field, deflected by a static and dynamic change caused by the environment of the object and by the object itself acting on the object moving along a controlled trajectory, and by comparing the measurement results to a magnetic footprint measured on the aforementioned controlled trajectory with the same means for measuring a magnetic field and recorded in advance in the memory, and also by deducing as a result of the comparison the location of the object on its controlled path of travel.

3. The method according to claim 1, wherein from the aforementioned magnetic footprints a three-dimensional magnetic map is formed, from which a four-dimensional magnetic map is further formed by combining the footprints measured at each position of the controlled path of travel and the time dimension with each other.

4. The method according to claim 1, wherein in connection with learning or initialization and in connection with operation of the object, the magnetic footprint to be measured in the direction of the three coordinates X, Y, Z is measured from the magnetic field of the earth modified by the immediate surroundings of the object and by the structures characteristic to the object itself without the use of separate position sensors or sensors intended for determining the location.

5. The method according to claim 1, wherein used for determining the location of the object, in addition to and/or as an aid to the measurement of the magnetic field, are a measurement of acceleration, which is performed with a device for measuring acceleration, which device is configured for moving along with the moving object and which is configured to give the direction information of the moving object to the measuring device, and/or a gyroscope, which is configured for moving along with the moving object and which is configured to give rotation direction of the moving object to the measuring device, and/or a pressure sensor, which is configured for moving along with the moving object and which is configured to give information about the pressure exerted in the environment of the moving object to the measuring device, and/or a machine vision arrangement, which for its part is configured for moving along with the moving object and which is configured to give visual information about the environment of the moving object to the measuring device.

6. The method according to claim 5, wherein the measured values of the magnetic fields measured with the means for measuring a magnetic field, measured values of acceleration and/or deceleration measured with the device for measuring acceleration, and image information obtained by the aid of a camera are recorded either in the own memory of the measuring device or in a memory of a control system of the object.

7. The method according to claim 1, wherein a gyroscope is used for producing information for the measuring device relating to the orientation and rotation direction of an object moving along a controlled trajectory, and a pressure sensor is used for producing information for the measuring device relating to the compression data acting on an object moving along a controlled trajectory or relating to the height position of the object, and other additional measuring means are used for producing information for the measuring device relating to the conditions of the environment of an object moving along a controlled trajectory.

8. The method according to claim 1, wherein a video signal or image signal is used in addition to and/or as an aid to the measurement of the magnetic field for determining the location of the object, which signal is produced with a camera configured for moving along with the moving object, which camera is configured to give to the measuring device status information about the structures of the object or information about the environment of the object.

9. The method according to claim 1, wherein at least the means for measuring a magnetic field are fitted on an elevator car and with the aforementioned means for measuring a magnetic field the characteristically determined magnetic field in relation to the own structures of the building and the structures of the elevator acting on the elevator car at the different locations of the path of travel of the elevator car is measured.

10. The method according to claim 9, wherein, in addition to and/or as an aid to the measurement of the magnetic field, for determining the location of an elevator car a measurement of acceleration is used, which is performed with a device for measuring acceleration, which is configured for moving along with the elevator car, and optionally a video signal or image signal is used as an aid, which signal is produced with a camera configured for moving along with the elevator car, and the measured values of the magnetic fields measured with the means for measuring a magnetic field, the measured values of acceleration and/or deceleration measured with the device for measuring acceleration, and the image information obtained by the aid of the camera, including door-open data of the doors of the elevator or view data of the floor levels, are recorded either in the own memory of the measuring device or in the control system of the elevator.

11. An arrangement for determining a location and/or speed of an object configured to move along a controlled trajectory in a magnetic field deflected by a static and/or dynamic change, the arrangement comprising a measuring device measuring at least the magnetic field acting on the object in its different locations, the measuring device being fitted in connection with the object, and comprising at least measuring means, which comprise at least means for measuring the magnetic field, from the measuring data received from the means for measuring the magnetic field, a magnetic footprint describing the magnetic field acting on the object in its different locations being formed, the magnetic footprint being configured to be recorded in a memory of the arrangement for later use, wherein
the arrangement comprises means for performing an initialization before actual operation or during operation of the object when moving the object on the controlled trajectory and by measuring at points determined by either time and/or position on the controlled trajectory the magnetic field acting on the object with the means for measuring a magnetic field and by recording the measurement results obtained in the memory of the arrangement as magnetic footprints, in addition to the means for measuring a magnetic field the arrangement comprises optional additional measuring means for measuring other sensor data of the object in its environment at that moment and/or the time used data, and means recording measurement results obtained from the optional additional measuring means in the memory of the arrangement, the arrangement also comprises means for fixing the location information of an object formed from the measurement results obtained at the aforementioned points determined by either time and/or position on the aforementioned controlled trajectory, and optionally the time information connected to the location information, to the aforementioned determined measuring locations of the controlled trajectory, during operation of the object the movement of the object is arranged to be measured with the same means for measuring a magnetic field as during the initialization, and optionally with the same optional additional measuring means as during the initialization, and the measurement results obtained are arranged to be compared to the time information and location information formed from the measurement results recorded in the memory of the arrangement during the initialization and recorded in the memory, and wherein the arrangement is configured to determine locations of the object during the operation and detect changes occurring in the operation in relation to location, motion state and condition of the object by comparing real-time measurement results obtained during operation of the object to the optimal sensor data formed from the measurement results recorded in the memory during the initialization.

12. The arrangement according to claim 11, wherein the means for measuring a magnetic field are configured to measure, in the direction of the three coordinates X, Y, Z of the magnetic field and in essentially real-time, the magnetic field deflected by a static and dynamic change caused by the environment of the object and by the object itself acting on the object moving along a controlled trajectory, and the arrangement comprises a control unit connected to the means for measuring a magnetic field, which control unit is configured to compare at least the measurement results of the means for measuring a magnetic field to a magnetic footprint measured on the aforementioned controlled trajectory with the same means for measuring a magnetic field and recorded in advance, and also to deduce as a result of the comparison at least the exact location of the object on its controlled path of travel.

13. The arrangement according to claim 11, wherein the arrangement comprises equipment suited to the purpose of creating and updating a four-dimensional magnetic map, and from the aforementioned magnetic footprints by the aid of the aforementioned equipment a three-dimensional magnetic map is formed, from which a four-dimensional magnetic map is further formed by combining the footprints measured at each position of the path of travel and the time dimension with each other.

14. The arrangement according to claim 11, wherein in connection with learning, initialization or self-adjustment or a corresponding function and in connection with operation of the object, the magnetic footprint to be measured in the direction of the three coordinates X, Y, Z is configured to be measured from the magnetic field of the earth modified by the immediate surroundings of the object and by the structures characteristic to the object itself without the use of separate position sensors or sensors intended for determining the location.

15. The arrangement according to claim 11, wherein the arrangement comprises, in addition to and/or as an aid to the means for measuring a magnetic field, a device for measuring acceleration and/or a camera producing a video signal or image signal, which are configured for moving along with the moving object.

16. The arrangement according to claim 15, wherein the arrangement comprises a processor unit and a memory, for processing and recording the measuring data obtained from the measuring means, including the measured values of the magnetic fields measured with the means for measuring a magnetic field, measured values of acceleration and/or deceleration measured with the device for measuring acceleration, and image information obtained by the aid of the camera.

17. The arrangement according to claim 11, wherein at least the means for measuring a magnetic field are configured to move along with an elevator car and the aforementioned means for measuring a magnetic field are arranged to measure at the different locations of the path of movement of the elevator car the characteristically determined magnetic field acting on the elevator car in relation to the own structures of the building and the structures of the elevator.

18. The arrangement according to claim 11, wherein the arrangement for determining the location of an elevator car comprises, in addition to and/or as an aid to the means for measuring a magnetic field, a device for measuring acceleration, which is configured to move along with the elevator car, and the arrangement also optionally comprises a camera configured for moving along with the elevator car, for producing a video signal or image signal, and the measured values of the magnetic fields measured with the means for measuring a magnetic field, the measured values of acceleration and/or deceleration measured with the device for measuring acceleration, and the image information obtained by the aid of the camera are configured to be recorded either in the own memory of the measuring device or in the control system of the elevator.

19. The arrangement according to claim 11, wherein a sensor system is disposed for acting on the path of travel, in addition to the natural magnetic field acting on the path of travel of the object, which sensor system supplements and improves the measurement result obtained with the measuring means, and when an elevator car is the moving object, permanent magnets or other sensors are disposed on the floor levels of the elevator and/or at other suitable points in the elevator hoistway, which sensors each individually act on the magnetic field to be measured on the path of travel of the elevator car and via that on the magnetic footprint.

20. A method of using the arrangement according to claim 11, comprising:
measuring by the means for measuring the magnetic field in the direction of three coordinates X, Y and Z the magnetic field of earth modified by structures characteristic at least to the immediate environment of the object and to the object itself, said means being configured for determining the location and/or speed of an object moving along a controlled trajectory in a magnetic field deflected by a static and/or dynamic change;
optionally measuring the acceleration and/or deceleration and/or the rotation direction of the moving object and/or the pressure exerted on the object; and
optionally producing by a camera a video signal or an image signal and/or a machine vision arrangement,
wherein the method is configured for determining the location of an elevator car configured to move in an elevator hoistway, of a crane configured to move on its path of travel, of a freight transport device or vehicle moving along a rail or track, or of some other corresponding device or object configured to move along a controlled trajectory, or for determining the path of movement and/or speed of movement of a moving object.

\* \* \* \* \*